Figure 4:
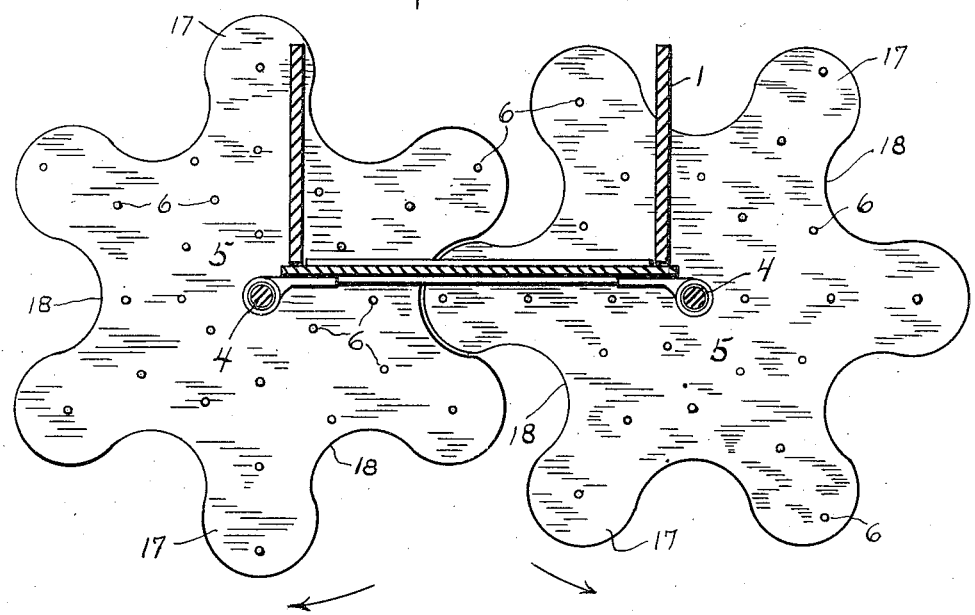

A. C. WOLF.
FERTILIZER DISTRIBUTER.
APPLICATION FILED MAY 31, 1913.
1,069,752.
Patented Aug. 12, 1913.
2 SHEETS—SHEET 1.
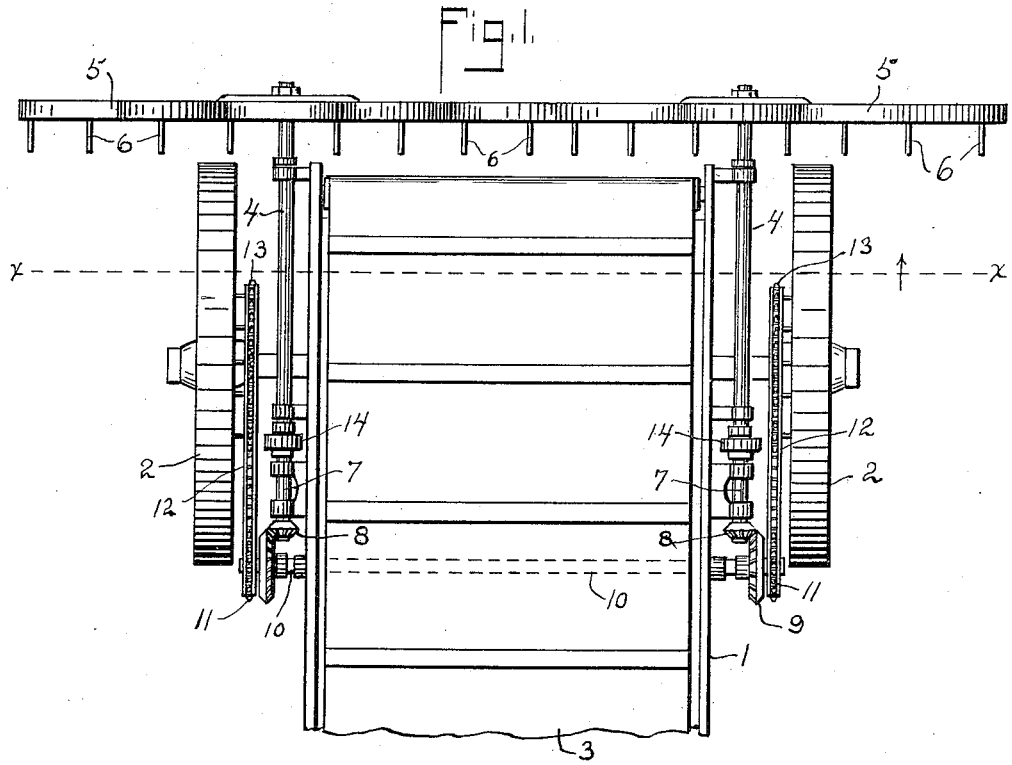
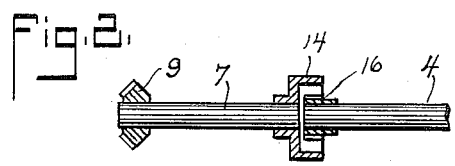
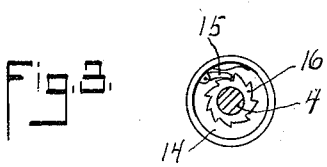
Witnesses
R. W. Mitchell
J. J. Ludens
Inventor
Andrew C. Wolf.
By Walter N. Haskell.
his Attorney

A. C. WOLF.
FERTILIZER DISTRIBUTER.
APPLICATION FILED MAY 31, 1913.

1,069,752.

Patented Aug. 12, 1913.
2 SHEETS—SHEET 2.

Witnesses

Inventor
Andrew C. Wolf.
Walter N. Haskell.
By
his Attorney

UNITED STATES PATENT OFFICE.

ANDREW C. WOLF, OF STERLING, ILLINOIS.

FERTILIZER-DISTRIBUTER.

1,069,752.  Specification of Letters Patent.  Patented Aug. 12, 1913.

Application filed May 31, 1913. Serial No. 770,913.

*To all whom it may concern:*

Be it known that I, ANDREW C. WOLF, a citizen of the United States, residing at Sterling, in the county of Whiteside and State of Illinois, have invented certain new and useful Improvements in Fertilizer-Distributers, of which the following is a specification.

My invention has reference to fertilizer distributers, and pertains specially to mechanism which is adapted to be used in connection with machines of that class which are provided with an apron, or conveyer, by means of which the load is delivered at the rear end of the machine.

The chief purpose of my device is to cause a distribution of the load, not only along the track of the machine, but also at some distance on each side thereof, whereby the fertilizer will be more thoroughly scattered over the ground, and a less number of trips of the machine across the field will be required.

In the drawings, Figure 1 is a plan view of the rear end of a machine equipped with my invention. Fig. 2 is a detail showing the adjacent ends of the shafts 4 and 7, and appurtenant parts. Fig. 3 is an inner face view of the wheels 14 and 16. Fig. 4 is a vertical cross-section in the line $x$—$x$ of Fig. 1.

1 represents the box of the machine, supported on rear carrying wheels 2, and provided with the usual apron or conveyer 3, by the operation of which the load is carried gradually to the rear end of the box.

Journaled at the sides of the box 1 are shafts 4, to the rear ends of which are fixed a pair of disks 5, provided on their inner faces with a plurality of pins or teeth 6. In line with the shafts 4 are rotatably mounted short shafts 7, to the forward ends of which are fixed gear pinions 8, engaged by gear-wheels 9 mounted on a rotary shaft 10 supported transversely of the box 1, and beneath the same. Upon the ends of the shaft 10 are fixed sprocket-wheels 11, connected by means of sprocket-chains 12 with sprocket-rims 13 attached on the inside of the wheels 2.

On the rear ends of the shafts 7 are fixed hollow wheels 14, carrying spring-controlled dogs 15 which engage the teeth of ratchet-wheels 16, fixed on the forward ends of the shafts 4. Said dogs and teeth are so disposed that the forward movement of the wheels 2, imparted from such wheels to the shaft 10, and from said shaft to the shafts 7, will cause a rotation of the shafts 4 in a direction to move the disks 5 inwardly and downwardly, as indicated by the arrows in Fig. 4. At the same time the movement of the load toward the rear of the machine brings the fertilizer into engagement with the pins 6, by which it is carried downwardly and outwardly in a continuous stream. The disks 5 are preferably formed with intermeshing corrugations 17 and 18. This not only insures a steadier operation of the wheels, but the outer pins 6 thereon overlap at the central part of the machine, causing a more thorough manipulation of the fertilizer at that point. The pins on one of the parts 17 are also preferably arranged so as to alternate in position with those of the adjacent corrugations on the same disk, such staggered relation of the pins adding to the efficiency of operation thereof. Upon one of the wheels 2 moving rearwardly, or being stationary while the opposite wheel is moving forwardly, the pawl 15 adjacent to such wheel merely slides over the teeth of the accompanying wheel 16, and there is no interference with the action of the opposite wheel 2, or mechanism operated thereby.

It will be seen that the disks 5 take the place of the usual drum or beater. In the rotation of the disks the outer parts thereof move with the greatest velocity, and the pins which are nearest the edges of the disks move with considerable speed, and throw the material the greatest distance from the machine. These teeth also pass through the central part of the load, so that the bulk of the load is handled thereby.

Many changes can be made in the form of said disks and the arrangement of the pins thereon; also in the manner of imparting movement thereto, without departing from the spirit of my invention.

What I claim as my invention and desire to secure by Letters Patent of the United States, is:

1. The combination with a fertilizer receptacle and carrying-wheels therefor, and means for conveying such fertilizer to the rear end of the receptacle, of a pair of disks, rotatably mounted at the rear end of said receptacle in a vertical plane at right angles to the movement of the load, provided on their inner faces with a plurality of pins;

and means for suitably rotating said disks upon the forward movement of the machine.

2. In combination with a fertilizer transporting receptacle, and conveying mechanism therein for moving the load gradually toward the rear end of the receptacle, a pair of disks rotatably mounted in a substantially vertical plane at the rear end of said receptacle, and provided on their edges with intermeshing corrugations; pluralities of pins on the inner faces of said disks; and means for suitably rotating said disks upon the forward movement of the machine.

3. In combination with a fertilizer receptacle and carrying-wheels therefor, and conveying mechanism therein for moving the load gradually toward the rear end of the receptacle; a pair of disks rotatably mounted at the rear end of said receptacle, in position to receive the contents thereof, and provided on their receiving faces with pluralities of pins; means for imparting movement to said disks from said carrying wheels; and means for interrupting the communication between either of said carrying-wheels and the disk operated thereby.

In testimony whereof I affix my signature in presence of two witnesses.

ANDREW C. WOLF.

Witnesses:
W. N. HASKELL,
CHAS. H. WOODBURN.

Copies of this patent may be obtained for five cents each, by addressing the "Commissioner of Patents, Washington, D. C."